(No Model.)  2 Sheets—Sheet 1.
S. R. SARGENT.
SEWING MACHINE.
No. 287,869. Patented Nov. 6, 1883.
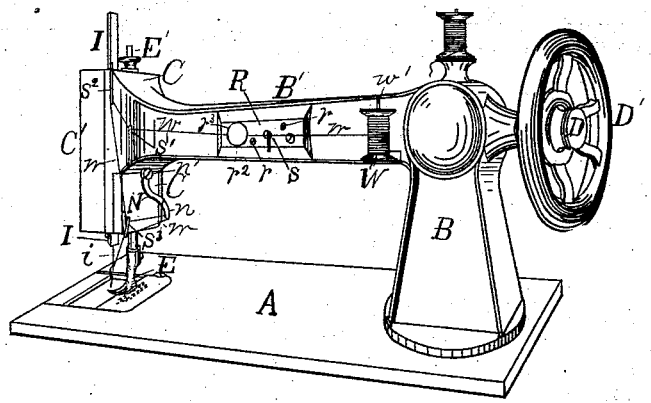
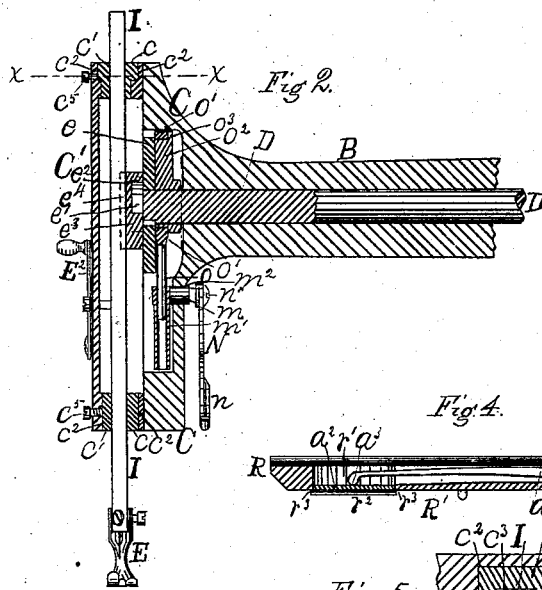
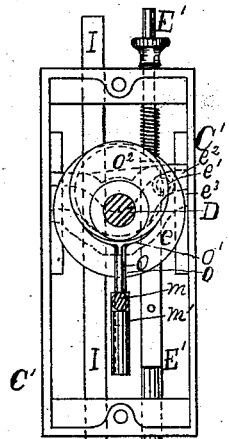
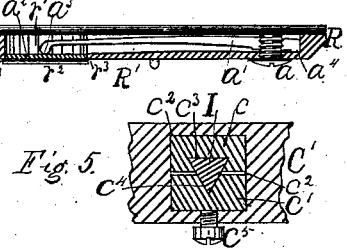
Witnesses
C. L. Parker
R. H. Whittlesey
Inventor
Samuel R. Sargent
By Attorney George H. Christy (No Model.) 2 Sheets—Sheet 2.
S. R. SARGENT.
SEWING MACHINE.
No. 287,869. Patented Nov. 6, 1883.
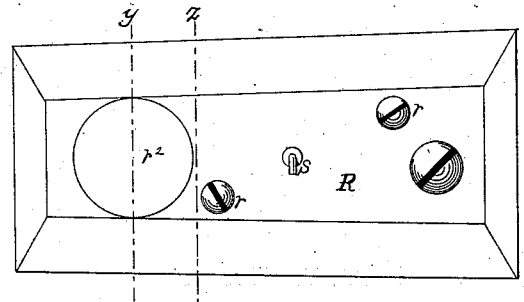
Fig. 7.
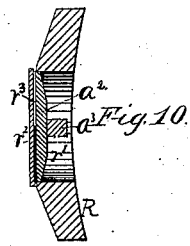
Fig. 10.
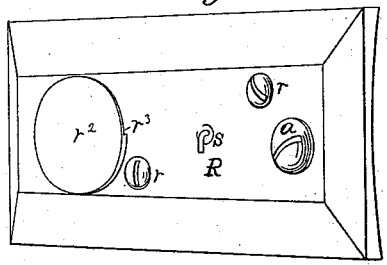
Fig. 8.
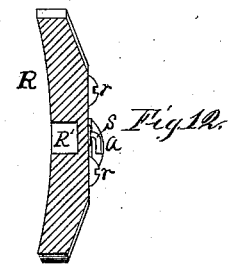
Fig. 12.
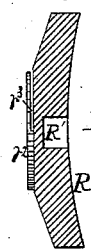
Fig. 11.
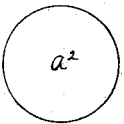
Fig. 9.
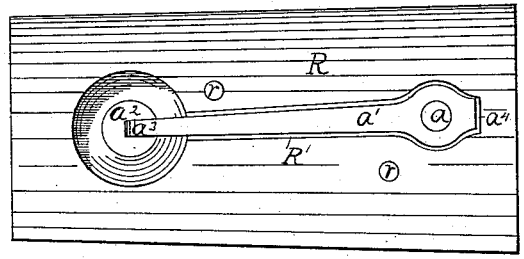
Witnesses: C. L. Parker, R. H. Whittlesey
Inventor: Samuel R. Sargent
By Attorney, George H. Christy

UNITED STATES PATENT OFFICE.

SAMUEL R. SARGENT, OF TERRE HAUTE, INDIANA.

SEWING-MACHINE.

SPECIFICATION forming part of Letters Patent No. 287,869, dated November 6, 1883.

Application filed January 8, 1883. (No model.)

*To all whom it may concern:*

Be it known that I, SAMUEL R. SARGENT, of Terre Haute, county of Vigo, State of Indiana, have invented or discovered a new and useful Improvement in Sewing-Machines; and I do hereby declare the following to be a full, clear, concise, and exact description thereof, reference being had to the accompanying drawings, making a part of this specification, in which—like letters indicating like parts—

Figure 1 is a perspective view of a part of a sewing-machine illustrative of my present invention. Fig. 2 shows on a scale larger than Fig. 1 a longitudinal vertical section of the head of the needle arm or bracket, such section being in part in the plane of the needle-bar and in part in the central plane of the arm or bracket. Fig. 3 is an interior view, in elevation, of the cap or head of the bracket, the scale being the same as Fig. 2. Fig. 4 is a horizontal sectional view of the tension mechanism, showing the same at or about full size. Fig. 5 is a horizontal section, full size, of a portion of the head of the needle-bracket, the section being taken in the plane of the line $x\,x$, Fig. 2. Fig. 6 is a perspective view of a portion of the needle-bar and cross-head, illustrative of the connection made between them. Fig. 7, Sheet 2, is an enlarged view, in side elevation, of the tension mechanism. Fig. 8 is a perspective view of the same. Fig. 9 is a view of the inner side or face of the mechanism shown in Figs. 7 and 8, also showing the spring and binding-disk both in place and removed. Fig. 10 is a vertical sectional view taken in the plane of the line $y\,y$, Fig. 7; and Figs. 11 and 12 show similar sections, taken in the line $z\,z$, Fig. 7, looking to the left and right, respectively.

My present invention relates to certan improvements in the tension, take-up, and needle-carrying mechanism of sewing-machines; and, in general terms, it consists in certain combinations of devices for holding the thread under tension between the spool and needle; also, for taking up the slack in the thread as the needle is raised, and for carrying and directing the needle, as hereinafter more fully described and claimed.

In the drawings, A represents the base-plate, and B B' the vertical and horizontal arms of the bracket, constituting the upper frame-work for carrying the driving-shaft and the parts of the operative mechanism connected therewith which are employed in manipulating the upper thread. The driving-shaft D is passed in the usual manner through the interior of the horizontal arm B', and journaled therein in suitable bearings at any desired points in its length. The shaft may be driven by the usual or any suitable means, and a hand-wheel, D', may be secured thereon for convenience in manipulating the machine. On the free or suspended end of the bracket-arm B' is cast a plate, C, to which a box, C', is secured in the usual way by screws passed through the box into the plate. Vertically through the chamber thus formed is passed the shaft E' of the presser-foot E, which may be raised and lowered by lever or crank $E^2$, having the usual connection with shaft E' for effecting such movements. These parts of the machine may be of any suitable or well-known design and construction, and may be varied, as desired, with reference to the particular class of work to be done by the machine.

In order to carry and direct the needle $i$ with precision, I make use of a needle-bar, I, triangular in cross-section, which is passed vertically through the box C', being guided and held in position by two-part bushings or blocks $c\,c'$, seated in suitable openings, $c^2$, in the upper and lower edges of box C'. One part, as $c$, of each guide-box is fixed stationary in its seat $c^2$, and is provided with a dovetail groove, $c^3$, adapted to receive a side or base portion of the triangular needle-bar, as illustrated in Fig. 5. The other part, $c'$, of the guide-box is provided with a V-groove, $c^4$, adapted to fit the apex of the bar or that part of it projecting from the groove $c^3$, and these parts $c'$ are movable within their seats, and are held upon the bar with the desired pressure by set-screws $c^5$, passed through the face of box or cap C'. By means of the form of needle-bar and adjustable guides thus provided the direction of motion of the bar and needle may be determined with great accuracy, a smooth and steady movement may be secured, the movable pieces $c'$ may be set up as the parts become worn, and thus all tendency to axial rotation or lateral movement of the needle and bar is effectually prevented.

Reciprocating movement is given to the needle and bar from driving-shaft D by means of a disk, $e$, on the end of the shaft within the box C', such disk carrying a wrist-pin and roller, $e'$, extending from its face, which play in a cam-groove, $e^2$, formed in the side face of a cross-bar or head, $e^3$. This cross-head is rigidly secured to the needle-bar by means of a vertical dovetail groove, $e^4$, in the cross-head, (see Fig. 6,) similar in form to groove $c^3$, into which the adjacent base side of the bar is passed longitudinally to the desired position, and then secured by a set-screw, $e^6$.

By means of the triangular form of needle-bar and the dovetail connection secured thereby between it and the cross-head a durable and secure attachment is made, well adapted to withstand both the vertical and transverse strain imposed upon it. The cam-groove $e^2$ may be of the usual form employed for imparting vertical motion from a rotary pin, with the usual provision in such form of groove for securing the desired periods of rest and rates of motion for the needle. These features of construction are well understood by those skilled in the art, and need not be illustrated or described in detail.

In order to take up the slack of thread $w$ as the needle $i$ is raised, I make use of a vibrating or reciprocating arm, N, having an opening or loop, $n$, formed at its lower curved end, through which the thread is passed previous to going to the needle-eye. At its upper end this arm is secured by an angular mortise and stud and by screw $n'$ to the protruding end of a rock-shaft, $m$, which latter is passed through and journaled in a suitable opening, $m^2$, in the plate C. From the inner end of shaft $m$, and at right angles thereto, is extended a tubular tail-piece, $m'$, adapted to receive a pin, $o$, which extends downward from an eccentric strap or yoke, $o'$, which latter encircles and fits upon an eccentric, $o^2$, secured on the rotary driving-shaft D. The strap is held upon the eccentric by the disk $e$ on one side and by a collar or flange, $o^3$, on the other side. The rotary motion of the shaft and eccentric gives to the eccentric strap and pin both vertical and horizontal movement, which imparts to shaft $m$ a rocking motion through the connection formed by the pin and by the tubular tail-piece $m'$. This connection permits the pin to slide vertically within the tubular passage of the tail-piece as the former is raised and lowered by the eccentric, but holds the two in line, whereby the horizontal movement given by the eccentric is effective in imparting the desired rocking motion to the shaft $m$ and arm N. The play of the pin within the tail-piece may be free and without friction, at least of such amount as to require lubrication. If desired, however, a tubular oiler may be inserted from plate C to reach this bearing; or oil may be turned from an opening above upon the strap $o'$ and permitted to run down the pin $o$. Ordinarily this will not be necessary.

Instead of the extended tail-piece $m$, a hole of suitable form to receive the pin $o$ may be made through the inner end of rock-shaft $m$, or a crank-arm may be attached to this end of the shaft, with the wrist of which the lower end of pin $o$ may have any suitable pivot-connection, and such modifications in the form of connection employed between the eccentric and rock-shaft whereby the rotary movement of the former is made to impart rocking movement to the latter I consider as coming within my invention.

By adjusting the eccentric $o^2$ in proper position on the shaft, the reciprocating or vibrating movement of arm N may be so adjusted with reference to the movements of the needle that its backward or take-up movement shall occur after the thread-loop has been formed and the shuttle has entered such loop. The range of vibratory motion of the take-up arm may be determined either by the throw of the eccentric, or the distance of shaft $m$ from the eccentric, or the length of such arm, or by two or more of these elements combined, so as to hold the thread taut as the needle is raised and the stitch is closed. The strain thus imposed upon the thread is determined by devices receiving direct and positive movement from the driving-shaft, which devices are independent both in operation and adjustment from those which carry the needle. These features of direct positive movement and independent operation and adjustment add materially to the precision and good working of the machine, and afford better means of adapting the machine to work, differing widely in character and quality.

In connection with this take-up mechanism I make use of an improved construction of mechanism for holding the thread under definite tension. This tension device is constructed and operated as follows:

A plate, R, having a recess, R', in its inner face, is secured by screws $r\ r$ to the side face of arm B'. At the forward end of this recess R' a hole, $r'$, is made through the plate, and a disk or raised plate, $r^2$, is secured to the outer face of plate R, covering the hole $r'$. This disk is secured to the plate by soldering or in other suitable way around a part—say the lower half of its periphery—thereby closing the hole around such half, but leaving a slit or opening, $r^3$, between the disk and plate leading to the hole around the other or upper half, through which the thread is passed, as illustrated in Fig. 1. Within the hole or recess $r'$, on the inner side of the plate, is seated a plain disk, $a^2$, which is held upon the inner face of disk $r^2$ with any desired degree of pressure by means of a spring, $a'$, secured within the recess R' by screw $a$, which enters the spring between its end bearings, one of which bearings is upon the disk, as at $a^3$, and the other upon the bottom of the recess, as at $a^4$. By turning the screw $a$ the space between the adjacent faces of disks $a^2\ r^2$ may be increased or diminished at pleasure, thereby imposing any desired pressure and tension upon the thread.

Instead of the strap-spring $a'$, a coiled spring or other suitable form of yielding elastic support, preferably a metal spring, may be seated between disk $a^2$ and the side of arm B', the tension or pressure of which may be adjusted by one or more screws inserted from either side of the arm. I prefer, however, the form of spring shown and the means described for adjusting its pressure, both on account of cheapness in construction and convenience in adjusting the tension thereby. Instead of securing a separate disk, $r^2$, over a hole, $r'$, in the plate, a recess corresponding to such hole may be made in the inner face of the plate under a raised surface formed on the outer surface of the plate and integral therewith, and in such case the slit $r^3$ may be made by sawing or cutting through the metal part way around the periphery of such raised surface. These modifications in the details of construction, and others of like nature I consider as coming within my invention.

This tension mechanism is not only simple in form and easily made, but is also covered and protected from injury, dirt, or carelessness, and is not liable to become rigid or inactive, as in devices employing felt or similar packing.

The spool W is placed, by preference, on a stand, $w'$, at or about the horizontal plane of the tension device. The thread $w$ is led from the spool through a guide, $s$, near the tension; thence through the slit $r^3$, where it is pressed between the plates $a^2 r^2$; thence through guide $s'$ on plate C at or about the level of the tension; thence upward through guide $s^2$; thence downward through guide $s^3$, which is secured to plate C at or about the level of the path described by loop $n$. From the guide $s^3$ it is carried through this loop $n$, and thence back through the lower bend of guide $s^3$ to the needle $i$.

In describing the construction and operation of mechanism for tightening the stitch I have assumed that the under thread is also held under tension. I have not shown mechanism for effecting this, nor for carrying the under thread or imparting feed, as any suitable or well-known construction of devices may be used for this purpose. Suitable means for accomplishing these ends form the subject-matter of other applications for patents filed by me, of even date herewith, serial numbers 81,249 and 81,250.

The features of improvement herein described for manipulating the upper thread are simple and durable, cheaply constructed, and, owing to the plain easy manner of adjusting them with relation to each other, they can be kept in good working order with little trouble by ordinary users of such machines.

I claim herein as my invention—

1. A needle-bar, I, of triangular form in cross-section, in combination with guide-boxes $c$ $c'$, cross-head $e^3$, having dovetail groove $e^4$ therein, adapted to receive the needle-bar and set-screw $e^6$, substantially as set forth.

2. The combination of take-up arm N, rock-shaft $m$, having a tubular guide on its inner end, eccentric strap $o'$, pin $o$, extending from the strap, adapted to move within the guide, eccentric $o^2$, and driving-shaft D, substantially as set forth.

3. In combination with supporting-plate C, the curved take-up arm N, having a thread opening or loop, $n$, at its free end, rock-shaft $m$, having a tubular tail-piece, $m'$, on its inner end, pin $o$, eccentric strap $o'$, eccentric $o^2$, and driving-shaft D, substantially as set forth.

4. A plate, R, having a raised surface, $r^2$, thereon, with recess $r'$ in the inner face of the plate under such raised surface, and slit opening $r^3$ into the recess surrounding in part its periphery, in combination with pressure-disk $a^2$, seated in recess $r'$, and a tension-spring for pressing plate or disk $a^2$ upon its seat, substantially as set forth.

5. The recessed plate R, having an opening, $r'$, therein, with a disk or cap, $r^2$, secured over such opening and closing the same around a part of its periphery, in combination with binding-disk $a^2$, seated in opening $r'$, spring $a'$, and screw $a$, substantially as and for the purposes set forth.

In testimony whereof I have hereunto set my hand.

SAMUEL R. SARGENT.

Witnesses:
C. L. PARKER,
R. H. WHITTLESEY.